United States Patent
Birnbaum et al.

(10) Patent No.: US 11,741,301 B2
(45) Date of Patent: *Aug. 29, 2023

(54) SYSTEM AND METHOD FOR USING DATA AND ANGLES TO AUTOMATICALLY GENERATE A NARRATIVE STORY

(71) Applicant: Narrative Science Inc., Chicago, IL (US)

(72) Inventors: Lawrence A. Birnbaum, Evanston, IL (US); Kristian J. Hammond, Chicago, IL (US); Nicholas D. Allen, Chicago, IL (US); John R. Templon, Chicago, IL (US)

(73) Assignee: Narrative Science Inc., Chicago, IL (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/195,193

(22) Filed: Mar. 8, 2021

(65) Prior Publication Data

US 2021/0192132 A1 Jun. 24, 2021

Related U.S. Application Data

(63) Continuation of application No. 16/689,699, filed on Nov. 20, 2019, now Pat. No. 10,956,656, which is a
(Continued)

(51) Int. Cl.
*G06F 40/20* (2020.01)
*G06F 16/22* (2019.01)
(Continued)

(52) U.S. Cl.
CPC .............. *G06F 40/20* (2020.01); *G06F 16/22* (2019.01); *G06F 16/2365* (2019.01);
(Continued)

(58) Field of Classification Search
CPC .............. G06F 40/00–58; G06F 16/22; G06F 16/2365; G06F 40/106; G06F 40/166; G06F 40/289; G06Q 10/10
See application file for complete search history.

(56) References Cited

U.S. PATENT DOCUMENTS 4,992,939 A 2/1991 Tyler
5,687,364 A 11/1997 Saund et al.
(Continued)

FOREIGN PATENT DOCUMENTS

WO 2006122329 A2 11/2006

OTHER PUBLICATIONS

Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
(Continued)

*Primary Examiner* — Jesse S Pullias
(74) *Attorney, Agent, or Firm* — Thompson Coburn LLP

(57) ABSTRACT

A system and method for automatically generating a narrative story receives data and information pertaining to a domain event. The received data and information and/or one or more derived features are then used to identify a plurality of angles for the narrative story. The plurality of angles is then filtered, for example through use of parameters that specify a focus for the narrative story, length of the narrative story, etc. Points associated with the filtered plurality of angles are then assembled and the narrative story is rendered using the filtered plurality of angles and the assembled points.

25 Claims, 11 Drawing Sheets

Related U.S. Application Data continuation of application No. 15/996,715, filed on Jun. 4, 2018, now Pat. No. 10,489,488, which is a continuation of application No. 15/664,414, filed on Jul. 31, 2017, now Pat. No. 9,990,337, which is a continuation of application No. 15/211,902, filed on Jul. 15, 2016, now Pat. No. 9,720,884, which is a continuation of application No. 15/011,743, filed on Feb. 1, 2016, now Pat. No. 9,396,168, which is a continuation of application No. 13/738,609, filed on Jan. 10, 2013, now Pat. No. 9,251,134, which is a continuation of application No. 12/779,683, filed on May 13, 2010, now Pat. No. 8,355,903.

(51) Int. Cl.

| | | |
|---|---|---|
| *G06F 16/23* | (2019.01) | |
| *G06Q 10/10* | (2023.01) | |
| *G06F 40/106* | (2020.01) | |
| *G06F 40/166* | (2020.01) | |
| *G06F 40/289* | (2020.01) | |

(52) U.S. Cl.
CPC .......... *G06F 40/106* (2020.01); *G06F 40/166* (2020.01); *G06F 40/289* (2020.01); *G06Q 10/10* (2013.01)

(56) References Cited

U.S. PATENT DOCUMENTS

| | | |
|---|---|---|
| 5,734,916 A | 3/1998 | Greenfield et al. |
| 5,794,050 A | 8/1998 | Dahlgren et al. |
| 5,802,495 A | 9/1998 | Goltra |
| 6,289,363 B1 | 9/2001 | Consolatti et al. |
| 6,651,218 B1 | 11/2003 | Adler et al. |
| 6,665,666 B1 | 12/2003 | Brown et al. |
| 6,968,316 B1 | 11/2005 | Hamilton |
| 6,976,031 B1 | 12/2005 | Toupal et al. |
| 7,085,771 B2 | 8/2006 | Chung et al. |
| 7,191,119 B2 | 3/2007 | Epstein et al. |
| 7,246,315 B1 | 7/2007 | Andrieu et al. |
| 7,333,967 B1 | 2/2008 | Bringsjord et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,818,329 B2 | 10/2010 | Campbell et al. |
| 7,836,010 B2 | 11/2010 | Hammond et al. |
| 7,856,390 B2 | 12/2010 | Schiller |
| 7,865,496 B1 | 1/2011 | Schiller |
| 8,046,226 B2 | 10/2011 | Soble et al. |
| 8,355,903 B1 | 1/2013 | Birnbaum et al. |
| 8,374,848 B1 | 2/2013 | Birnbaum et al. |
| 8,447,604 B1 | 5/2013 | Chang |
| 8,463,695 B2 | 6/2013 | Schiller |
| 8,494,944 B2 | 7/2013 | Schiller |
| 8,515,737 B2 | 8/2013 | Allen |
| 8,630,844 B1 | 1/2014 | Nichols et al. |
| 8,630,912 B2 | 1/2014 | Seki et al. |
| 8,630,919 B2 | 1/2014 | Baran et al. |
| 8,645,124 B2 | 2/2014 | Karov Zangvil |
| 8,676,691 B2 | 3/2014 | Schiller |
| 8,688,434 B1 | 4/2014 | Birnbaum et al. |
| 8,762,285 B2 | 6/2014 | Davis et al. |
| 8,775,161 B1 | 7/2014 | Nichols et al. |
| 8,812,311 B2 | 8/2014 | Weber |
| 8,819,001 B1 | 8/2014 | Zhang |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 9,047,283 B1 | 6/2015 | Zhang et al. |
| 9,164,982 B1 | 10/2015 | Kaeser |
| 9,208,147 B1 | 12/2015 | Nichols et al. |
| 9,251,134 B2 | 2/2016 | Birnbaum et al. |
| 9,396,168 B2 | 7/2016 | Birnbaum et al. |
| 9,697,178 B1 | 7/2017 | Nichols et al. |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,977,773 B1 | 5/2018 | Birnbaum et al. |
| 9,990,337 B2 | 6/2018 | Birnbaum et al. |
| 10,185,477 B1 | 1/2019 | Paley et al. |
| 10,482,381 B2 | 11/2019 | Nichols et al. |
| 10,489,488 B2 | 11/2019 | Birnbaum et al. |
| 10,657,201 B1 | 5/2020 | Nichols et al. |
| 10,755,042 B2 | 8/2020 | Birnbaum et al. |
| 10,755,046 B1 | 8/2020 | Lewis Meza et al. |
| 10,762,304 B1 | 9/2020 | Paley et al. |
| 10,853,583 B1 | 12/2020 | Platt et al. |
| 10,943,069 B1 | 3/2021 | Paley et al. |
| 10,956,656 B2 * | 3/2021 | Birnbaum ............... G06F 16/22 |
| 10,963,649 B1 | 3/2021 | Sippel et al. |
| 10,990,767 B1 | 4/2021 | Smathers et al. |
| 11,003,866 B1 | 5/2021 | Sippel et al. |
| 11,023,689 B1 | 6/2021 | Sippel et al. |
| 11,030,408 B1 | 6/2021 | Meza et al. |
| 11,042,708 B1 | 6/2021 | Pham et al. |
| 11,042,709 B1 | 6/2021 | Pham et al. |
| 11,042,713 B1 | 6/2021 | Platt et al. |
| 11,068,661 B1 | 7/2021 | Nichols et al. |
| 11,126,798 B1 | 9/2021 | Lewis Meza et al. |
| 11,144,838 B1 | 10/2021 | Platt et al. |
| 11,170,038 B1 | 11/2021 | Platt et al. |
| 11,182,556 B1 | 11/2021 | Lewis Meza et al. |
| 11,188,588 B1 | 11/2021 | Platt et al. |
| 11,222,184 B1 | 1/2022 | Platt et al. |
| 11,232,268 B1 | 1/2022 | Platt et al. |
| 11,232,270 B1 | 1/2022 | Platt et al. |
| 11,238,090 B1 | 2/2022 | Platt et al. |
| 11,288,328 B2 | 3/2022 | Birnbaum et al. |
| 11,334,726 B1 | 5/2022 | Platt et al. |
| 11,341,330 B1 | 5/2022 | Smathers et al. |
| 11,341,338 B1 | 5/2022 | Platt et al. |
| 11,475,076 B2 | 10/2022 | Birnbaum et al. |
| 11,501,220 B2 | 11/2022 | Birnbaum et al. |
| 11,521,079 B2 | 12/2022 | Nichols et al. |
| 11,561,684 B1 | 1/2023 | Paley et al. |
| 11,561,986 B1 | 1/2023 | Sippel et al. |
| 11,562,146 B2 | 1/2023 | Paley et al. |
| 2002/0083025 A1 | 6/2002 | Robarts et al. |
| 2002/0099730 A1 | 7/2002 | Brown et al. |
| 2002/0107721 A1 | 8/2002 | Darwent et al. |
| 2003/0110186 A1 | 6/2003 | Markowski et al. |
| 2003/0182102 A1 | 9/2003 | Corston-Oliver et al. |
| 2003/0212543 A1 | 11/2003 | Epstein et al. |
| 2003/0217335 A1 | 11/2003 | Chung et al. |
| 2004/0083092 A1 | 4/2004 | Valles |
| 2004/0103116 A1 | 5/2004 | Palanisamy et al. |
| 2004/0138899 A1 | 7/2004 | Birnbaum et al. |
| 2004/0230989 A1 | 11/2004 | Macey et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0125213 A1 | 6/2005 | Chen et al. |
| 2005/0273362 A1 | 12/2005 | Harris et al. |
| 2006/0031182 A1 | 2/2006 | Ryan et al. |
| 2006/0074634 A1 | 4/2006 | Gao et al. |
| 2006/0100852 A1 | 5/2006 | Gamon et al. |
| 2006/0101335 A1 | 5/2006 | Pisciottano |
| 2006/0212446 A1 | 9/2006 | Hammond et al. |
| 2006/0224570 A1 | 10/2006 | Quiroga et al. |
| 2006/0253783 A1 | 11/2006 | Vronay et al. |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0185846 A1 | 8/2007 | Budzik et al. |
| 2007/0185847 A1 | 8/2007 | Budzik et al. |

(56) References Cited

U.S. PATENT DOCUMENTS

| | | |
|---|---|---|
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2008/0140696 A1 | 6/2008 | Mathuria |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0089100 A1 | 4/2009 | Nenov et al. |
| 2009/0119095 A1 | 5/2009 | Beggelman et al. |
| 2009/0144608 A1 | 6/2009 | Oisel et al. |
| 2009/0144609 A1 | 6/2009 | Liang et al. |
| 2009/0157664 A1 | 6/2009 | Wen |
| 2010/0075281 A1 | 3/2010 | Manuel-Devadoss et al. |
| 2010/0082325 A1 | 4/2010 | Manuel-Devadoss et al. |
| 2010/0146393 A1 | 6/2010 | Land et al. |
| 2010/0161541 A1 | 6/2010 | Covannon et al. |
| 2011/0044447 A1 | 2/2011 | Morris et al. |
| 2011/0078105 A1 | 3/2011 | Wallace |
| 2011/0087486 A1 | 4/2011 | Schiller |
| 2011/0113315 A1 | 5/2011 | Datha et al. |
| 2011/0191417 A1 | 8/2011 | Rathod |
| 2011/0246182 A1 | 10/2011 | Allen |
| 2011/0249953 A1 | 10/2011 | Suri et al. |
| 2011/0314381 A1 | 12/2011 | Fuller et al. |
| 2012/0069131 A1 | 3/2012 | Abelow |
| 2012/0109637 A1 | 5/2012 | Merugu et al. |
| 2013/0091031 A1 | 4/2013 | Baran et al. |
| 2013/0145242 A1 | 6/2013 | Birnbaum et al. |
| 2015/0186504 A1 | 7/2015 | Gorman et al. |
| 2015/0347391 A1 | 12/2015 | Chen et al. |
| 2016/0019200 A1 | 1/2016 | Allen |
| 2017/0344518 A1 | 11/2017 | Birnbaum et al. |
| 2018/0260380 A1 | 9/2018 | Birnbaum et al. |
| 2021/0192144 A1 | 6/2021 | Paley et al. |
| 2022/0114206 A1 | 4/2022 | Platt et al. |
| 2022/0284195 A1 | 9/2022 | Platt et al. |
| 2023/0027421 A1 | 1/2023 | Birnbaum et al. |
| 2023/0053724 A1 | 2/2023 | Birnbaum et al. |

OTHER PUBLICATIONS

Sripada, S., Reiter, E., and Davy, I. (2003). SumTime-Mousam: Configurable Marine Weather Forecast Generator. Expert Update 6(3):4-10.

Storyview, Screenplay Systems, 2000, user manual.

Theune, M., Klabbers, E., Odijk, J., dePijper, J., and Krahmer, E. (2001) "From Data to Speech: A General Approach", Natural Language Engineering 7(1): 47-86.

Thomas, K., and Sripada, S. (2007). Atlas.txt: Linking Geo-referenced Data to Text for NLG. Paper presented at Proceedings of the 2007 European Natural Language Generation Workshop (ENLG07).

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

U.S. Appl. No. 13/186,346, filed Jul. 19, 2011 (Nichols et al.).

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

Prosecution History for U.S. Appl. No. 15/996,715, now U.S. Pat. No. 10,489,488, filed Jun. 4, 2018.

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool For Generating Weather Forecast Texts. In Proceedings of the American Meteorological Society AI Conference (AMS-98), Phoenix, Arizona.

(56) References Cited

OTHER PUBLICATIONS

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Memorandum Opinion and Order for *O2 Media, LLC* v.*Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 Media, LLC.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Movie Magic Screenwriter, Write Brothers, 2009, user manual.
Office Action for U.S. Appl. No. 13/186,346 dated May 29, 2013.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Prosecution History for U.S. Appl. No. 12/779,636, now U.S. Pat. No. 8,688,434, filed May 13, 2010.
Prosecution History for U.S. Appl. No. 12/779,668, now U.S. Pat. No. 8,374,848, filed May 13, 2010.
Prosecution History for U.S. Appl. No. 12/779,683, now U.S. Pat. No. 8,355,903, filed May 13, 2010.
Prosecution History for U.S. Appl. No. 13/186,308, now U.S. Pat. No. 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/464,635, filed May 4, 2012.
Prosecution History for U.S. Appl. No. 13/464,675, now U.S. Pat. No. 10,657,201, filed May 4, 2012.
Prosecution History for U.S. Appl. No. 13/464,716, now U.S. Pat. No. 8,630,844, filed May 4, 2012.
Prosecution History for U.S. Appl. No. 13/738,560, now U.S. Pat. No. 8,843,363 filed Jan. 10, 2013.
Prosecution History for U.S. Appl. No. 13/738,609, now U.S. Pat. No. 9,251,134 filed Jan. 10, 2013.
Prosecution History for U.S. Appl. No. 15/011,743, filed Feb. 1, 2016.
Prosecution History of U.S. Appl. No. 15/211,902, now U.S. Pat. No. 9,720,884, filed Jul. 15, 2016.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Weston et al., "A Framework for Constructing Semantically Composable Feature Models from Natural Language Requirements", SPLC '09: Proceedings of the 13th International Software Product Line Conference, Aug. 2009, p. 211-220.

\* cited by examiner

SYSTEM AND METHOD FOR USING DATA AND ANGLES TO AUTOMATICALLY GENERATE A NARRATIVE STORY

CROSS-REFERENCE AND PRIORITY CLAIM TO RELATED PATENT APPLICATIONS

This patent application is a continuation of U.S. patent application Ser. No. 16/689,699, filed Nov. 20, 2019, now U.S. Pat. No. 10,956,656, which is a continuation of U.S. patent application Ser. No. 15/996,715, filed Jun. 4, 2018, now U.S. Pat. No. 10,489,488, which is a continuation of U.S. patent application Ser. No. 15/664,414, filed Jul. 31, 2017, now U.S. Pat. No. 9,990,337, which is a continuation of U.S. patent application Ser. No. 15/211,902, filed Jul. 15, 2016, now U.S. Pat. No. 9,720,884, which is a continuation of U.S. patent application Ser. No. 15/011,743, filed Feb. 1, 2016, now U.S. Pat. No. 9,396,168, which is a continuation of U.S. patent application Ser. No. 13/738,609, filed Jan. 10, 2013, now U.S. Pat. No. 9,251,134, which is a continuation of U.S. patent application Ser. No. 12/779,683, filed May 13, 2010, now U.S. Pat. No. 8,355,903, the entire disclosure of which is incorporated herein by reference.

STATEMENT REGARDING FEDERALLY SPONSORED RESEARCH OR DEVELOPMENT

This invention was made with government support under Grant No. IIS-0856058 awarded by the National Science Foundation. The government has certain rights in the invention.

BACKGROUND

Data and information pertaining to events, circumstances, and entities in various types of domains, such as sports, business and finance, crime, education, real estate, etc., is readily available. The subject invention functions to use such available data and information to automatically create narrative stories that describes domain event(s), circumstance(s) and/or entity(ies) in a comprehensible and compelling, e.g., audience customized, manner.

SUMMARY OF THE INVENTION

For automatically generating a narrative story hereinafter is described in greater detail a system and method that functions to receive data and information pertaining to domain event(s), circumstance(s), and/or entity(ies), i.e., domain related data and information, use the received domain related data and information to determine one or more derived features for the domain event(s), circumstance(s), and/or entity(ies), i.e., domain related derived features, use the received domain related data and information and/or one or more domain related derived features to identify one or more angles for the narrative story, filter the plurality of angles for the narrative story, select, retrieve, assemble and order facts or points associated with the filtered plurality of angles for the narrative story, and render the narrative story using the filtered plurality of angles and the assembled points.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

Figure 1:
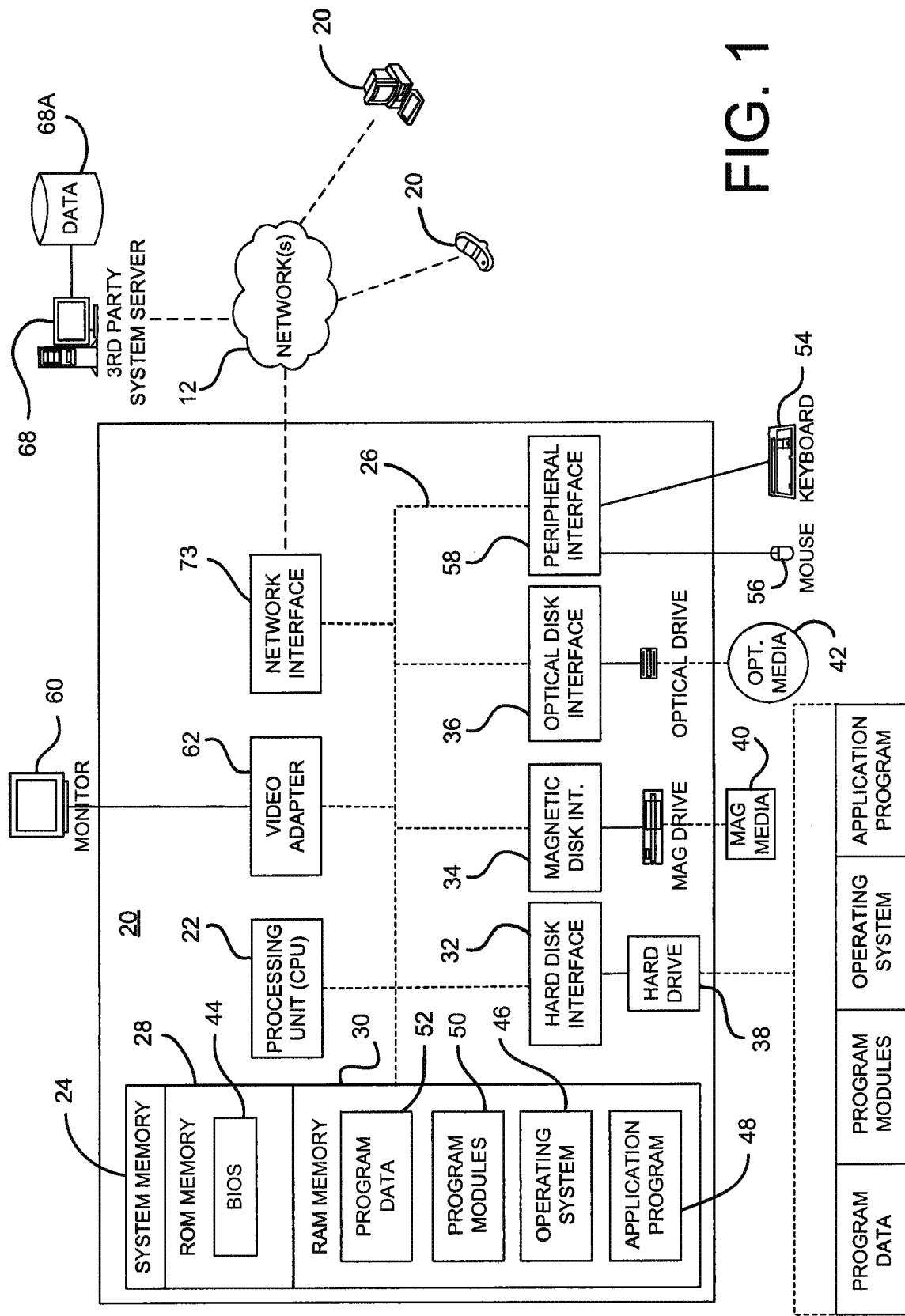
FIG. 1 illustrates in block diagram form components of an exemplary network system which functions to use data and information to automatically create a narrative story.

A system and method for using data and information pertaining to event(s), circumstance(s), and/or entity(ies) in a domain or domains, e.g., sports, business, financials, crime, education, medical, census, social indicators, etc., to automatically create narrative stories is hereinafter described. As shown in FIG. 1, the system and method is preferably implemented in the context of a plurality of processing devices linked via a network, such as the World Wide Web or the Internet. In this regard, a processing device 20, illustrated in the exemplary form of a computer system, is provided with executable instructions to, for example, provide a means to access data and information pertaining to one or more domain events and to create from such accessed data and information narrative stories. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices 20 linked via a local or wide-area network whereby the executable instructions may be associated with and/or executed by one or more of multiple processing devices 20.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures (e.g., data and information that is to be used to generate a story), program modules and other data for the processing device 20. Those skilled in the art will further appreciate that other types of computer readable media that can store data may be used for these same purposes. Examples of such media devices include, but are not limited to, magnetic cassettes, flash memory cards, digital videodisks, Bernoulli cartridges, random access memories, nano-drives, memory sticks, and other read/write and/or read-only memories. A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as application programs that function to create a story from domain event data and information, provide a user interface that allows a user to specify parameters for use in generating a customized, narrative story, etc.), other program modules 50, and/or program data 52. Still further, computer-executable instructions may be downloaded to one or more of the computing devices as needed, for example, via a network connection.

An end-user or operator, may enter commands (e.g., to customize narrative stories to an intended audience, etc.) and information (e.g., to key in data and/or information to be used in generating narrative stories, to indicate the logical location of that information in a network or file system, etc.) into the processing device 20 through input devices such as a keyboard 54 and/or a pointing device 56. While not illustrated, other input devices usable for these purposes may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the third party data and information system server 68 having associated data repository 68A. In this regard, while the third party system server 68 has been illustrated in the exemplary form of a computer, it will be appreciated that the third party system server 68 may, like processing device 20, be any type of device having processing capabilities. Again, it will be appreciated that the third party system server 68 need not be implemented as a single device but may be implemented in a manner such that the tasks performed by the third party system server 68 are distributed to a plurality of processing devices linked through a communication network.

For performing tasks as needed, e.g., to provide domain data and/or information to processing device 20, the third party system server 68 may include many or all of the elements described above relative to the processing device 20. By way of further example, the third party system server 68 includes executable instructions for, among other things, handling database queries, providing results from database queries, handling search requests, providing search results, providing RSS feeds, etc. Communications between the processing device 20 and the third party system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the third party system server 68.

Figure 2:
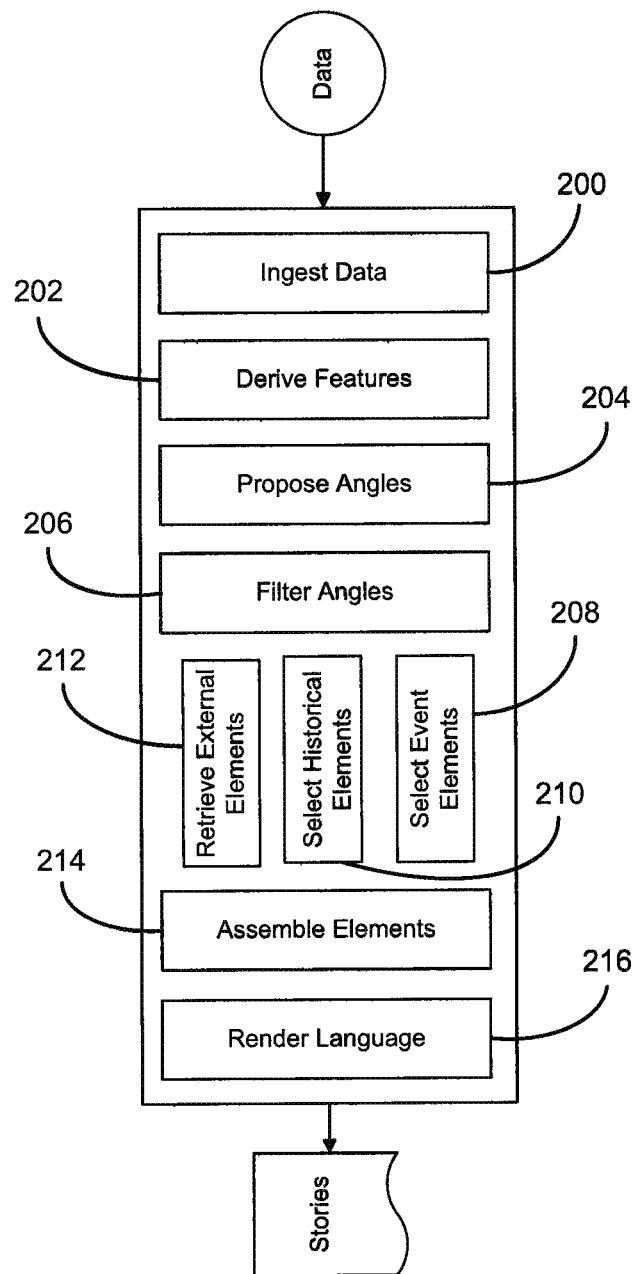
FIG. 2 illustrates in flow chart form an exemplary process for using data and information to automatically create a narrative story.

Turning now to FIG. 2, to create a narrative story from domain data and information, the processing device 20 is provided with one or more applications that function to ingest data and information (individually and collectively referred to hereinafter as "data") 200, derive from the data one or more features 202, propose angles for the narrative story 204, filter and prioritize the angles for the narrative story 206, select event or other situational elements for inclusion in/with the narrative story 208, select historical, forward looking, or other contextual elements for inclusion in/with the narrative story 210, retrieve external elements for inclusion in/with the narrative story 212, assemble the elements for inclusion in/with the narrative story 214, and render the narrative story 216, e.g., in a given language, at a given reading level, etc. As will be described in greater detail below, the rendered, narrative story may be self-contained, i.e., all of the elements may be embedded directly within the story narrative itself, or the rendered, narrative story may include one or more elements that are provided to accompany the story narrative, e.g., elements such as video, sound, text, etc. that may be included with the story or within sidebars, footnotes, be linked to, and the like. It will also be appreciated that the story need not be rendered solely as a written story but can be rendered in selected video clips, audio clips, etc. with or without additional textual or audio commentary. Still further the story can be rendered in animation or as a graphical simulation as desired. For example, via use of the subject invention a story can be presented using animation to provide a reenactment of aspects of a domain event.

Figure 3:
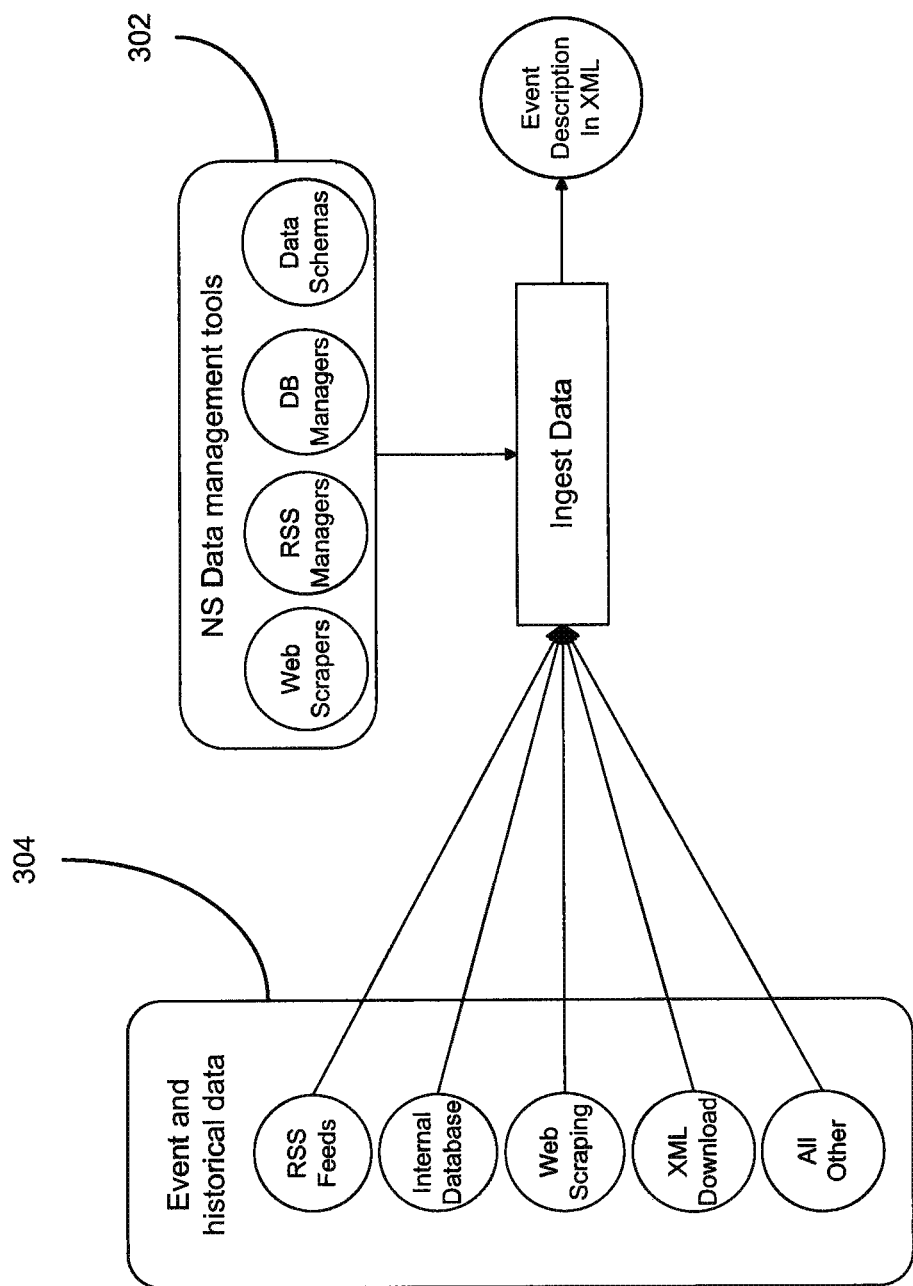
FIG. 3 illustrates an exemplary system which functions to ingest data in accordance with the process illustrated in FIG. 2.

As noted above, the input to the system is data. In the exemplary case of a sporting event such as a baseball game, this input data may include event data in the form of a game box score, historical data about a team and/or player, more general game, player, team and/or league history data (such as records), and forward-looking data about games, players, teams, league schedules, etc. The input data might also include derived features produced by external sources, including expectations based on computations and/or aggregations (such as forecasts, predictions, or odds produced by betting markets). Generally, as shown in FIG. 3, applications 302 may be provided that allow the input data 304 to be pulled/scraped by the processing device 20 from an external source, such as third party system server 68, pushed to and received by the processing device 20 from an external source, such as third party system server 68, read by the processing device 20 from a storage media, such as magnetic media 40 or optical media 42, be manually provided to the processing device 20 via use of keyboard 54, scanner, microphone, etc. and the like without limitation. It is to be additionally appreciated that the domain input data that is thus ingested by the processing device 20 will typically be structured numeric and/or quasi-numeric data, i.e., the data will fall into particular fields and/or categories and will be known to relate to specific events, situations, entities, etc., or aggregations thereof. For example, in the exemplary case of a baseball game, the event data may consist of one or more of a box score, line score, and play-by-play data (play-by-play data being quasi-numeric data in that it is traditionally recorded and conveyed in telegraphic English with a small, fixed lexicon and, as such, is basically equivalent to numeric data). In general the nature/structure of such event data is pre-determined by conventions of the domain or domain experts.

Figure 4:
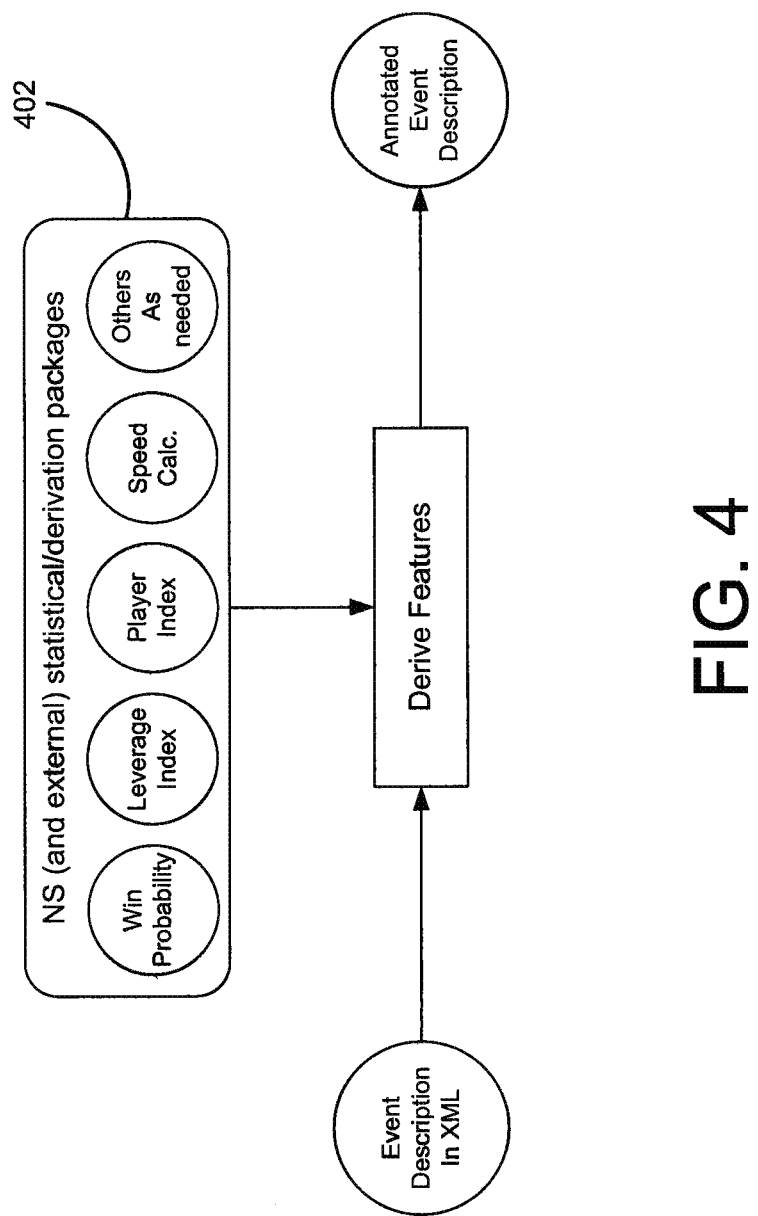
FIG. 4 illustrates an exemplary system which functions to derive features in accordance with the process illustrated in FIG. 2.

Once the input data is ingested into the system, e.g., received, parsed considering the domain conventions, and stored in an XML, or other data format, the system then functions to compute derived features for the input data as shown in FIG. 4.[1] In this regard, the derived features function to help determine aspects of a domain situation (e.g., events, circumstances, entities, etc.) that are likely candidates for inclusion in a story narrative, i.e., given the vast amount of data available about any given situation, the derived features function to support the capacity of the system to pick out the most critical aspects of the situation that may be desirable to include in a narrative description. Generally, the derived features of a domain situation 402 are developed based on computations and comparisons involving input data (or other derived features), describe or pertain to certain aspects of the situations, events, entities, etc., of interest, and are typically numerical or Boolean in nature. Thus, for example, derived features might include determining if the input data matches a particular pattern, has a particular kind of value (e.g., is a maximum or minimum), shows a delta (change) in a feature that is significant in some way (e.g., is above a certain threshold, significantly greater that the median change in that value over some interval etc.), crosses a particular threshold (e.g., zero, or a prior record etc.), deviates from expectations, results in a significant change in the output of a predictive model, etc. The particular derived features 402 that are to be used to help identify aspects of a domain situation that may be desirable to include in a story narrative may be selected based upon various parameters such as one or more of the domain itself (e.g., the computations and comparisons for events such as a baseball game, a football game, stock valuation, etc. may be different), a focus for the narrative story (e.g., the computations and comparisons may be selected to focus on game input data generally, on input data associated with a specific individual participating in the game, etc.), a genre for the narrative story (e.g., the computations and comparisons may be selected to focus on a season, a career, a single game, two specific games, two specific companies, etc.), a length for the story, etc. As will be appreciated, the parameters that are used to select derived features for application to a domain event may be specified to the system via use of an appropriately provided user interface, configuration files, etc. It will also be appreciated that derived features may range from the general to the specific and that derived features may be built upon other derived features.

[1] Depending upon domain, genre of story, circumstances, etc., the system may compute no derived features; or domain features may be supplied to the system from external sources.

By way of specific, non-limiting example, considering the domain of a baseball game, the derived features of interest may include, without limitation:

Game score—a measure, computed for each player, that indicates how well he or she played (e.g., there is one measure for hitters and one for pitchers).[2]

[2] Game score was developed by sports statistician Bill James.

Win probability—an historically-based estimate that determines, given the state of the game, the probability that each team will win (primarily focusing on the delta, i.e., change, in win probability produced by each play in the game since this is an indicator of the importance of that play, e.g., a play which produces a large delta, particularly one that shifts which team is predicted to win, is likely an important play in the game).[3]

[3] Win probability and leverage index were developed by the sports statistician Tom Tango.

Leverage index—a measure of how much impact a play might have had on the game (leverage index is useful to detect possible missed opportunities in the game, e.g., a situation in which a number of men are on base and the batter strikes out ending the inning, that can delineate and/or explain not only what did happen or what is the case, but what might have happened or been the case and didn't or wasn't).

While the foregoing describes well-known, exemplary derived features for use in connection with a baseball game, it is to be appreciated that the nature of the derived features of interest will depend upon the kind(s) of entities, events, and/or situations that the story narrative is about as well as the kind of narrative that is desired, e.g., the story parameters specified to the system. Accordingly, each domain will have its own set of derived features, using data relevant to the given domain, and computing values that make sense in the domain. To this end, the system may use well-known derived features currently used by analysts of a particular domain and/or may use derived features that are developed for any future needs.

Returning to the specific example of baseball, as described above win probability is the expected likelihood, for each team, that it will win the game given the current state of the game. What the systems actually uses as a derived feature however is delta or change in win probability over some interval (e.g., a single play). In other words, a play in which there is a big change in the expectation that a given team will win—most dramatically, a change from being expected to win to being expected to lose or vice versa—is an important play. Such plays are "turning points" in the game. They should be included in the narrative of the game and their role in the outcome should be made clear whether explicitly or implicitly.

More generally, in most if not all sports domains, there will be an analog of win probability that can be used by the system in this way. Applied to each state of the play (however that is determined or defined in the given sports), these analogs will compute the expected likelihood of one or another contestant emerging victorious in the event. Intervals over which these expectations change dramatically, particularly short intervals, are going to be "turning points" in the event, and the events that take place during those intervals should be included in the narrative.

Even more generally, in most data-rich domains it is possible to compute derived features expressing the expected likelihood of a variety of outcomes. To the extent that a given class of outcomes is in the focus of a narrative the system is writing—which may be itself determined by the interests of the audience or the genre of the narrative—a derived feature that computes an expected likelihood of a particular outcome in that class will be useful in just the same way as win probability. That is, a large change in the value of that expected likelihood over a given interval, particularly a relatively short interval, signifies that the events that took place in that interval were important and should therefore be included in a narrative description of the overall situation. Hence, in general the system can use features that express the expected likelihood of various outcomes—more specifically, the presence of large changes in the expected likelihood of a given set of outcomes over a given interval or event—to help determine the aspects of a situation involving those outcomes which should be included in a narrative account of that situation.

There are, as previously described, other classes of derived features (besides those which track changes in the likelihood of expected outcomes) that can similarly be used to help determine which aspects of a situation should be included in a narrative. For example, in the domain of baseball, leverage index computes the possible impact of a play in a baseball game and can thus be used to detect not only when important things happen but when they could have happened but didn't, i.e., missed opportunities. These again are situations which should likely be included in a narrative describing the game. The system thus uses leverage index to help select plays which should be included in narratives describing baseball games. More generally, other sporting events, and other domains altogether, will also possess derived features or metrics which indicate the potential for action or change in a given state of affairs whether or not a change actually occurs. The system can thus use such derived features or metrics to help determine aspects of a situation which should be included in a narrative about that situation.

To take yet another example, in many cases crossing a threshold—as determined using an appropriate derived feature—indicates an interesting event which may be desirable to include in a narrative story. For instance, in business, crossing from loss to profit is an important change in circumstances, certain aspects of which—when it occurred, the magnitude of the change, etc.—it may be desirable to include in a narrative about a given business over a given interval of time. Similarly, surpassing a personal, team, or league record in a given sport indicates an important event the details of which (who, when, etc.) may be included in a narrative story about a situation involving that record-breaking performance. Thus, in the various domains, the system can use specific derived features of this nature in the generation of narrative stories in that domain.

Similarly, any feature the value of which deviates significantly from prior expectation, whether the source of that expectation is due to a local computation or from an external source, is interesting by virtue of that deviation from expectation and, when such deviation is discerned by an appropriate derived feature, may be desirable to include in a narrative story about the situation to which that feature pertains. For example, in business, the feature may be profits per share in a given quarter, and the prior expectation may simply be the median forecast for those profits from industry analysts. In sports, the feature may be whether a given horse wins, places, or shows in a race, and the prior expectation may simply be the odds of those outcomes in betting markets. Still further, big deltas in the values of most features, occurring in relatively short periods of time (where the size of the change and the length of the period of time over which it occurs may be specified explicitly or may be empirically determined based on prior data), are probably interesting and indicate aspects of the situation that should likely be described in a narrative story about the situation or entity to which the feature pertains—for example, in describing the stock price of a given company. Thus, it will be understood that the nature of the derived features may consider, without limitation, big deltas (changes) in input data or in other derived features over time, space, or some other independent variable; particular "regions" in which these changes are especially pronounced; relationships to thresholds (particularly crossing them in either direction); extremes (both maxima and minima in the current context as well as relation to historical extremes); outliers in general; comparison and/or contrast between data items (e.g., population growth in two adjacent towns over some period of time); comparisons with and particularly deviations from expectations; comparisons with prior history both individual and aggregated; computations of predicted outcomes or trends based on current circumstances and deviations from or changes in these predictions over time; inflection points; etc.

Finally, just as derived features function to support the capacity of the system to pick out the most critical aspects of the situation that may be desirable to include in a narrative description, they may be used to determine whether it is desirable to write a narrative description of the situation in the first place. For example, crossing a threshold which is a prior record is a notable occurrence in many domains (sports, business, etc.) and when that occurs it will be useful to generate a narrative about the circumstances in which it has taken place. Thus the system can use features like this to determine that it should generate an appropriate narrative story.

Figure 5:
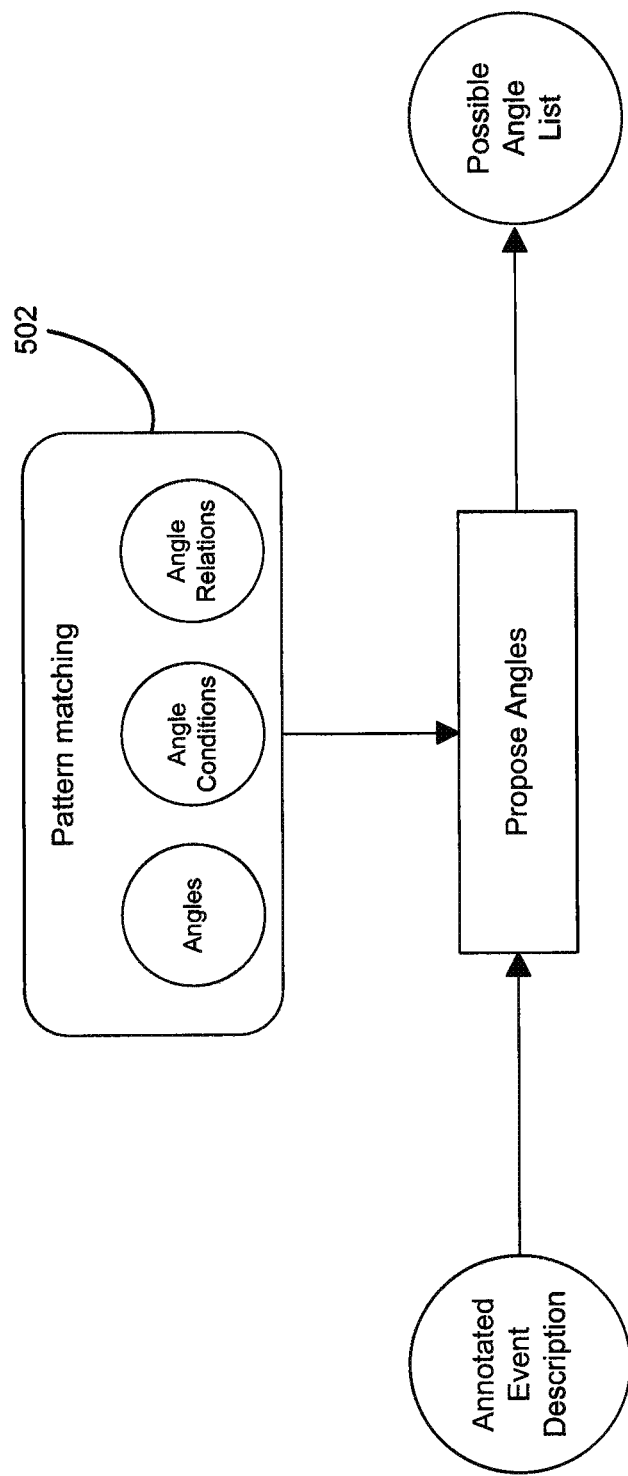
FIG. 5 illustrates an exemplary system which functions to propose angles in accordance with the process illustrated in FIG. 2.

Once the system has used the received data and information and/or one or more derived features to identify one or more features within the data, or aspects of the situation to which those features pertain, that may be important for inclusion within the narrative story, the system, as illustrated in FIG. 5, then functions to use a library of angles, with associated angle conditions and angle relations, 502 to determine one or more potentially relevant angles for the story. In this regard, angles are higher-level explanatory or narrative structures or models of a thematic nature that provide overall coherence and structure to the narrative. An angle is an abstract, high-level pattern of events, circumstances, and entities, and their features, not tied to any specific text or language, and often applicable to multiple domains. Angles are overarching structures that connect the specific facts of the situations, events, or entities described in the narrative being constructed, highlighting certain specific facts while subordinating others, and providing an overall account and characterization of or way to view those specific facts.

For example, if the domain is baseball, the situation is a game, and the selected genre is a game story or "recap," then applicable angles can include models of game action as a whole, as well as of the performance of individual players or aggregate entities, such as "come-from-behind victory," "back-and-forth horserace," "rout," "holding-off a late surge by the opposing team," "heroic individual performance," "strong team effort," etc. Such angles may be combined for example to produce a compound narrative model such as "come-from-behind victory due to an heroic individual performance." If on the other hand the domain were still baseball, but the selected entity of interest were an individual player, and the selected nature or genre of the narrative story concerned a player over a series of games in a season, then the applicable angles might be "steady improvement" or "came out of a slump." Still further, it the domain were again baseball, the selected entity were still an individual player, but the selected genre of the narrative story now concerned lifetime career, the potentially relevant angles might be "consistent player," "had late comeback," "burned out early," etc. It is therefore to be understood that angles may be relatively abstract and potentially applicable to a variety of sports or games or even to other domains entirely, e.g., "come-from-behind victory" is applicable in a wide variety of competitive situations while "beat expectations" is applicable in almost any domain involving change over time, or they may be applicable only in the specific domain at hand, e.g., "pitcher's duel" or "walk-off win" are applicable only to baseball.[4] In addition, angles may be grouped in hierarchical clusters, e.g., there are different kinds of "blowout" games.

[4] Although a "pitcher's duel" is itself an instance of a more abstract angle, namely, a competitive situation that is dominated by defensive as opposed to offensive action.

The conditions of applicability for the potentially relevant angles are evaluated in terms of the input domain data and/or the derived features, resulting in a set of proposed or candidate angles for the narrative being constructed. The nature of the angles that may be potentially relevant to and considered for utilization in describing a given situation, event, entity, etc., will therefore depend on the domain, the nature of the particular situation, event, or entity, as well as the nature or genre of the narrative story which is being constructed, as illustrated above. Furthermore, it will be understood that a given narrative story may incorporate one or more angles and that angles may be conflicting or mutually exclusive (i.e., either one characterization or the other will be applied at a given time in a given narrative story, but not both) or they may be potentially complementary. More particularly, angles are represented computationally as explicit, abstract data structures with associated procedures, including procedures which are used in the rendering process to produce the final narrative story. Angles have conditions of applicability in terms of the derived features and/or the initial (input) data of the situations, events, entities, etc., to which they may be applied. For example, the conditions of applicability of "an heroic individual effort that comes to naught" in baseball (or, suitably generalized, in other domains) are characterized by exceptional performance (either compared with aggregated historical expectations embodied in a derived feature such as game score, or in terms of more specific expectations around the performance of the individual in question) coupled with the loss of the game by that individual's team.

Figure 6:
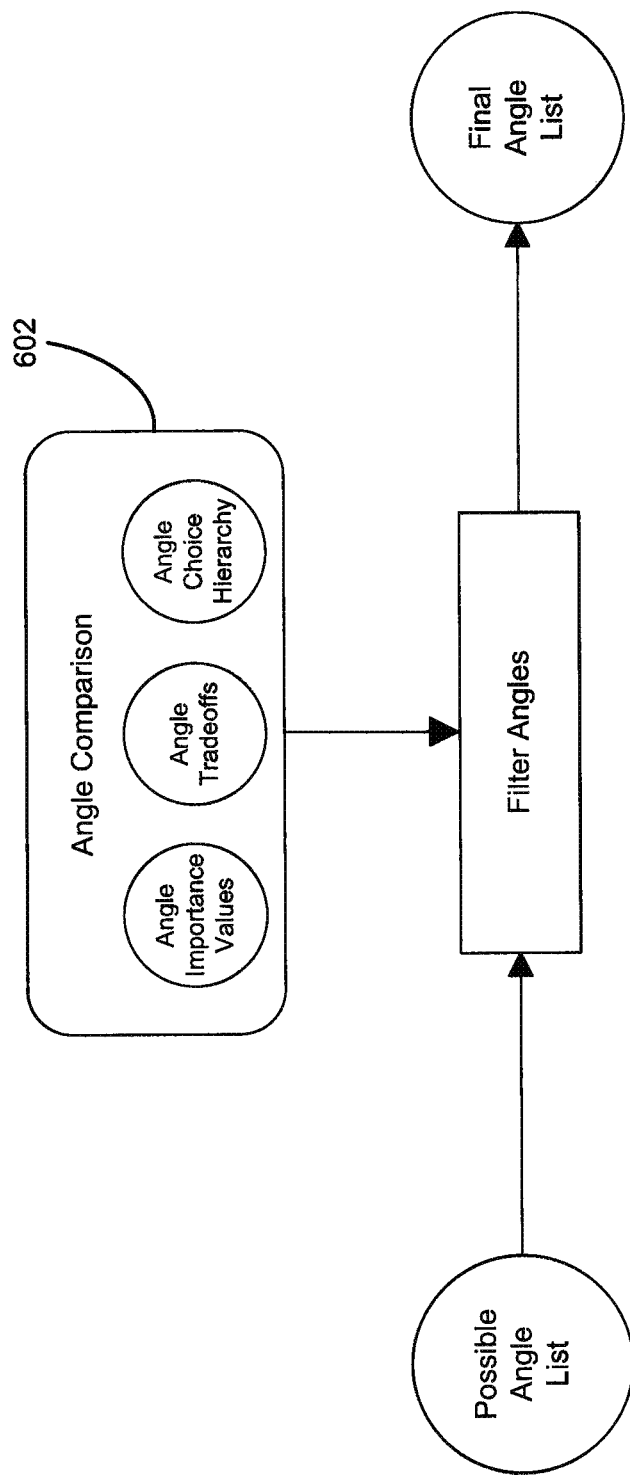
FIG. 6 illustrates an exemplary system which functions to filter angles in accordance with the process illustrated in FIG. 2.
Figure 7:
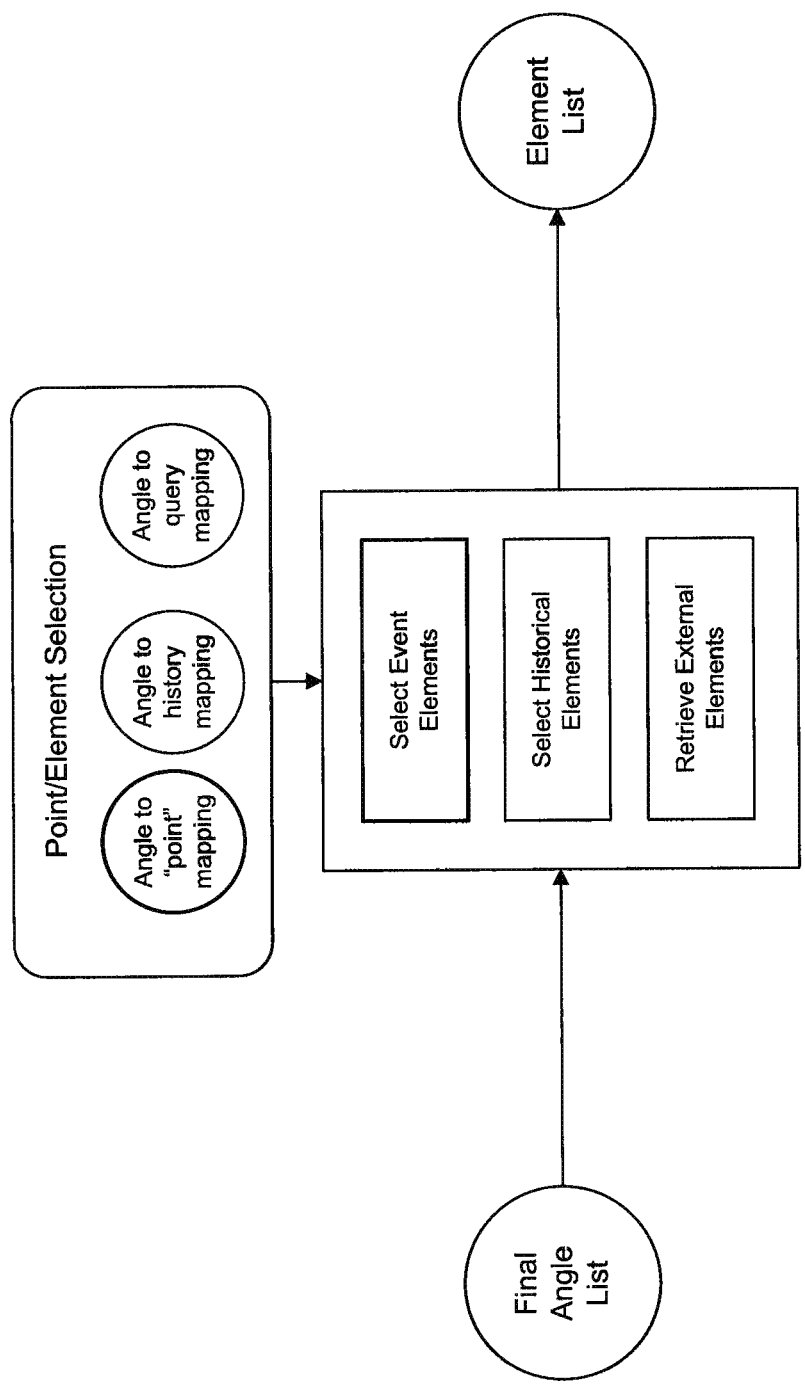
FIGS. 7-10 illustrate exemplary systems which function to select, retrieve, and assemble story elements in accordance with the process illustrated in FIG. 2.
Figure 8:
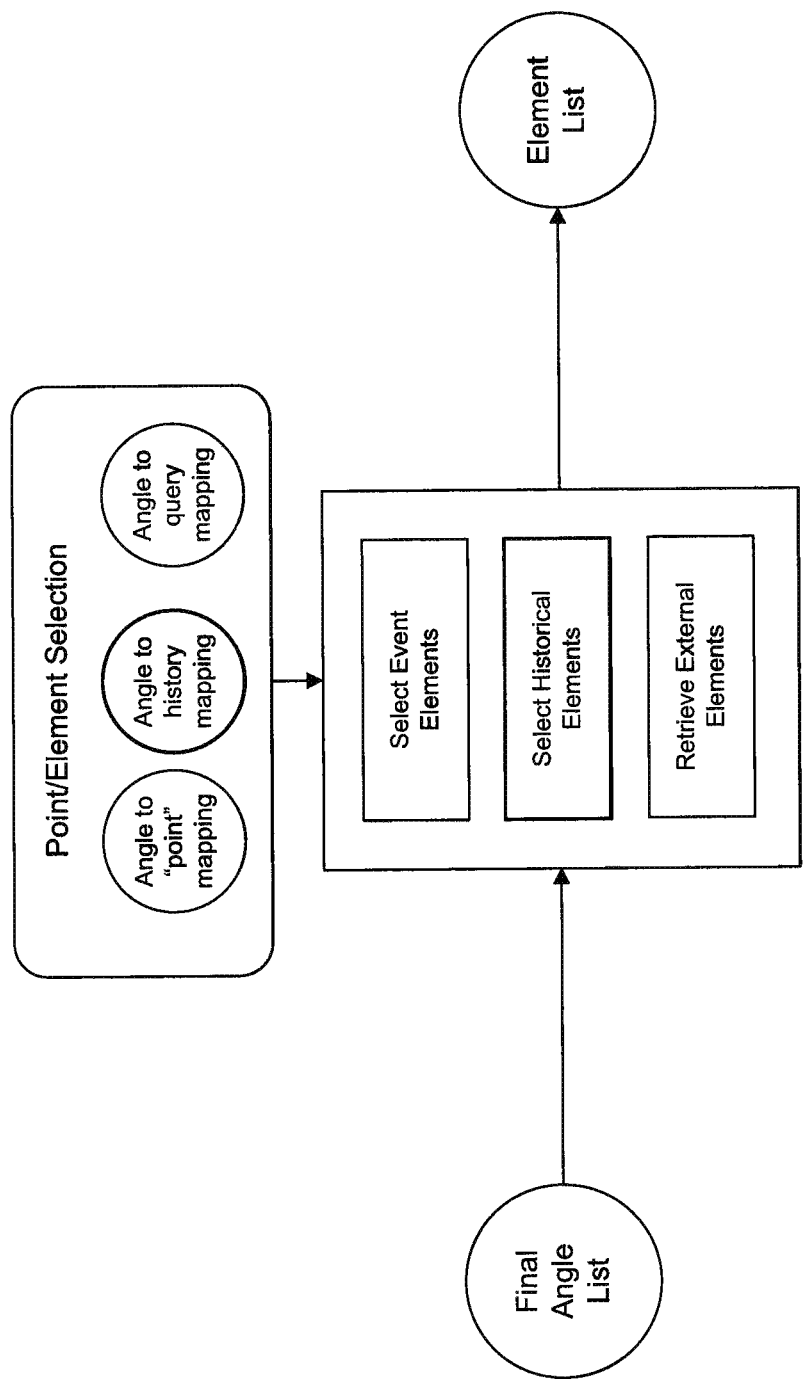
Figure 9:
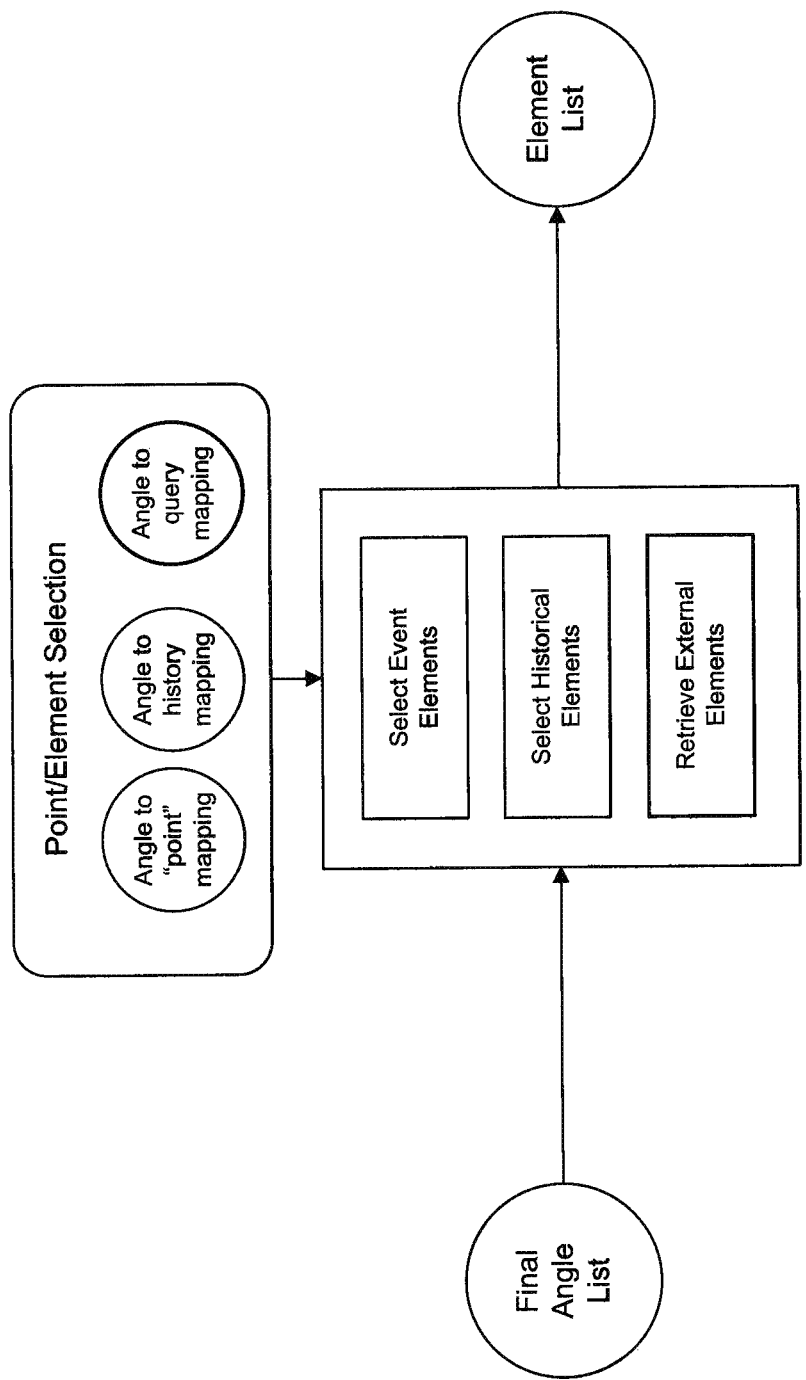
Figure 10:
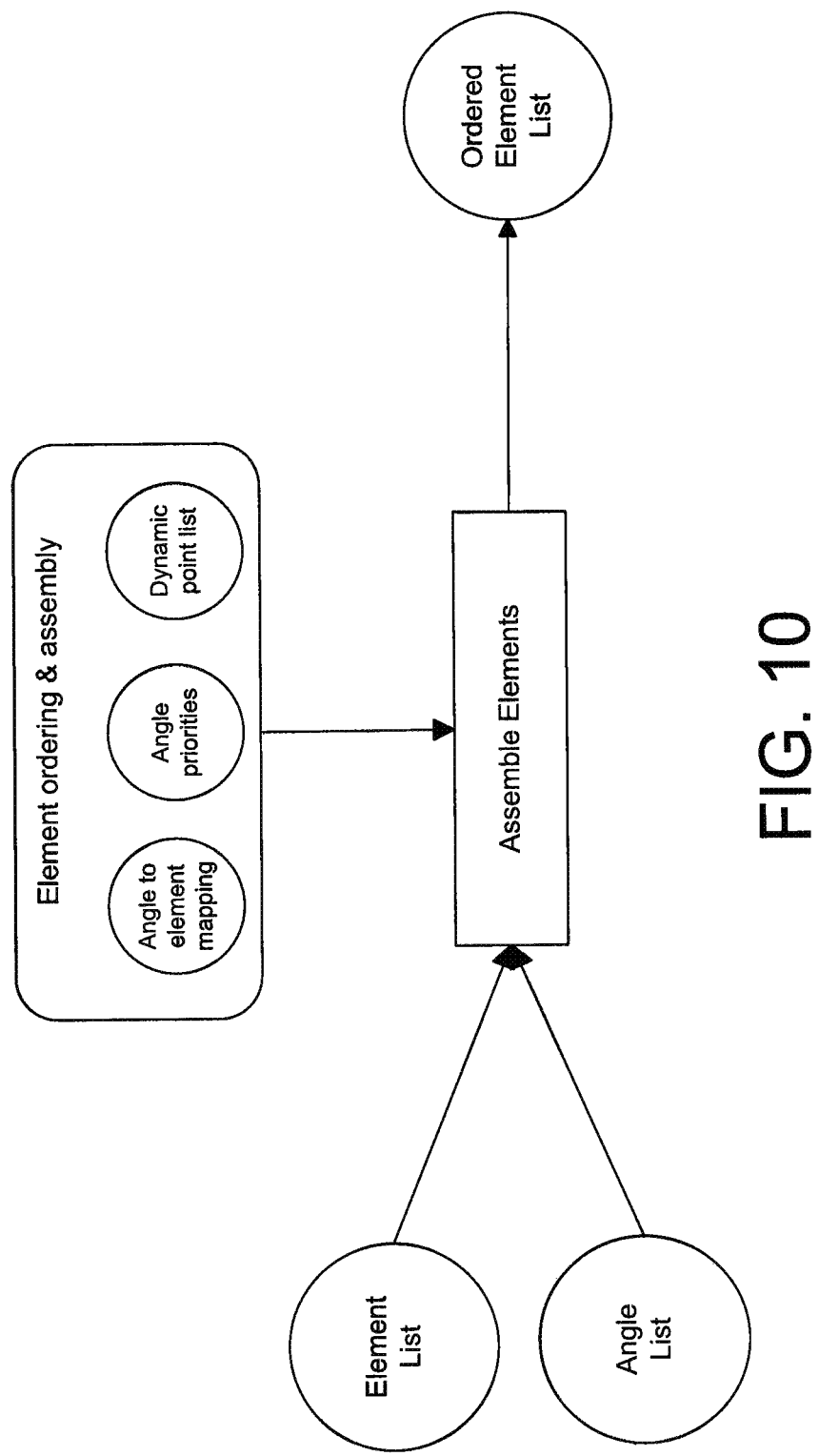

Once the various angles that may be applicable to the story have been determined from the event data and derived features (as well as any specified parameters of interest, such as an entity of focus, nature or genre of the narrative story, etc.), the system then functions to determine, using various angle related information 602 as shown in FIG. 6, which of those angles may be best used in creating the narrative story. To this end, each angle is provided with an importance value (e.g., scaled from 1-10) which is either fixed or a function of the input data and derived features that were used to determine its applicability. These importance values expresses how important or interesting the given angles may be in constructing a given narrative and are used to determine which angle(s) will be preferred among a set of mutually exclusive angles, i.e., are used to filter the angles, as well as to help determine the order/hierarchy in which the filtered angles will be presented in the overall narrative story. Because the conditions of applicability of different angles may refer to entirely different input data and/or derived features, which may be measured or expressed in terms of entirely different scales, some care should be taken to "normalize" these disparate scales in calculating the importance values of angles that depend upon data or features expressed therein.

The determination of how to handle potentially conflicting angles depends on the exact nature or genre of the narrative story to be constructed. A straightforward game story, for example, may simply choose one of these angles to utilize. A more complex version of this genre might include, in cases where conditions of angle applicability were nearly equal, or importance values were close, multiple angles, connected in a larger narrative story structure that expresses the ambiguity of the situation, e.g., "it might be called an X, but in the end it was a Y" where "X" and "Y" are terms or expressions that explicitly "give voice" to the angles in question. Angles may also be applied from different temporal, individual, etc. points of view, for example, only in retrospect after a game is completed, or alternatively from a number of temporal viewpoints during the game, thus resulting in more complex narratives such as "It looked like it was going to be a rout by the seventh inning, but the Wildcats came back and nearly won in the ninth inning"

As now shown in FIGS. 7-10, once the angles have been determined and ordered, they are explicitly and directly connected to the specific facts or aspects of the events, situations, entities, etc., which support them and to which they pertain, i.e., which they connect, organize, characterize, and render coherent. These specific facts or aspects of the domain situation are called points. Points may be either individual elements of the situation (e.g., an individual play such as a specific hit, or the change in stock price of an individual company on a given day) or they may be aggregations of those elements (e.g., a string of hits in an inning, or revenue growth in an industry over a series of quarters). In keeping with the non-limiting example, in baseball game stories, the points are the specific game events, circumstances, and entities of interest, i.e., the plays and players which participate in the chosen angles. These facts are characterized or expressed in terms of the input data that were used to determine the applicability and importance of the angle, either directly or through a derived feature. For example, if the selected, applicable angle is "holding-off a late surge by the opposing team," then there must be, late in the game, a high-leverage index play that did not come to fruition and actually change the outcome, but might have. This is the condition of applicability (or part of it) of this angle, and the specific play, as indicated by the input data that gave rise to and supports the derived feature corresponding to this condition of applicability for the angle, would therefore be the point to which the angle pertains (and which it characterizes), and to which it is therefore to be connected. Thus, it will be understood that the connection between points and angles may be established directly in the course of determining the applicability (or lack thereof) of the angle. That is, in the course of computing (i.e., determining) whether or not the angle is applicable, certain domain facts (or data pertaining to those facts) will be utilized as input to that determination, either directly or indirectly as input to derived features which are themselves utilized as input to that determination. The specific domain facts (or data pertaining to those facts) which, taken as input either directly or indirectly, lead to the determination that the angle is applicable are the points (facts) that will then be connected to the angle.

In further cases the applicability of angles may be determined through use of computations that do not directly establish a connection to the relevant underlying facts. In these instances, a method is used to establish the connection between an angle and the relevant point(s). For example, if game score is used to determine the best player in a game, then it may be necessary to go back and establish exactly what it is that a player did that was exemplary for inclusion in the narrative. In this instance, that can be accomplished by attaching a description, for example in the form of a procedure, to a "strongest player" angle containing an explicit listing of kinds of "good" baseball actions, in order of importance or "goodness." This information can then be used to guide identification of specific instances of those actions for inclusion with the angle when presented in the narrative story.

Whether the connection between angles and the points to which they pertain (or equivalently, points and the angles which characterize them) is established directly or through some additional procedure, it will be understood that the determination of which angles will apply to the narrative under construction also serves to determine the points which will be included in that narrative. In other words, angles, like derived features, help to determine the aspects of the domain situation (e.g., events, circumstances, entities, etc.) that are likely candidates for inclusion in a story narrative, i.e., given the vast amount of data available about any given situation, the determined angles function to support the capacity of the system to pick out the most critical aspects of the situation that may be desirable to include in a narrative description.

Once angles and points have been linked, another source of potential conflict between angles exists, namely, among angles that link to the same points. In this case importance values may again be used to determine preference and order. If all of the points pertaining to an angle are subsumed in another angle of higher importance, that angle may be eliminated. Alternatively, the angle may be generated in a somewhat truncated form, since many of the points to which it pertains will already have been generated and expressed in the narrative story in conveying the more important angles in the narrative story.

Still further, points may be mandated for inclusion in a narrative story not only because they are relevant to an important angle, but simply due to the nature of the particular narrative genre at hand (i.e., they are narrative conventions). For example, in a baseball game story, it is always necessary to discuss the pitching and how well the starting pitcher did. If the relevant points are not subsumed in an applicable angle, they must nevertheless be related somewhere in the story (typically, on account of their less central status, towards the end). Similarly, points not previously expressed in relation to angles but that are nevertheless noteworthy in some general sense—typically because they express outliers in terms of historical expectations (innings with lots of hits, for example) including recent circumstances (e.g., involve a player who hasn't played recently, or perhaps ever, for the given team)—will also be added to the story.

Points may also be mandated for inclusion because of narrative conventions related to audience expectations or interests, for example of a personalized or localized nature. For instance, points involving home team players, or even those involving specific players, may be preferentially included, on account of audience interest in those players.

In addition to the angle- or genre-relevant points, the system may also utilize the angles, selected story focus, genre of story, narrative conventions, etc. to specify and locate additional relevant material that is to be presented in and/or with the narrative story that is to be created. In some cases the specific information that meets the appropriate criteria may be sought in local or remote databases. For example, in describing a point involving a pitcher, it will be relevant to insert information about his or her record so far in the season, or against the particular opposing team, if available. Similarly, in describing a point involving a home run by a player, it may be useful to mention how many home runs they've hit this season, or how many more they need to hit for a team or league record. Alternatively, in business stories, in describing a point involving the CEO of a company, it may be useful to mention the CEO's age. These opportunities to insert specific types of relevant additional information are associated with particular entities or points and the constraints on information that might usefully be inserted are determined jointly by narrative convention, the specific point, and the nature of the additional relevant data that might be available.

The system may also be programmed to search the Internet for information that pertains to a person who has been identified as being important to a given angle, e.g., where they went to high school or college, career accomplishments, video clips (showing a play or the person), sound bites, pictures, quotes, etc., or that pertains to a particular event that has been identified as important, e.g., quotes about that event from the people involved. These opportunities to insert relevant additional information may also determined by narrative conventions. In order to fulfill these sorts of opportunities, the system is able to automatically formulate queries to the web or other structured and unstructured data sources, looking for text or other information that meets the specific appropriate requirements indicated by the angle and the specific point. These additional information items or elements, once located, may be woven into a given angle and/or may be presented with the narrative story in footnotes, sidebars, etc. or be linked to. Queries may also be generated to search for relevant textual comments from social media sites and systems, including blogs and twitter; and location information (if available) and time stamps may be used to correlate comments from onlookers with particular points in the story being generated.

Figure 11:
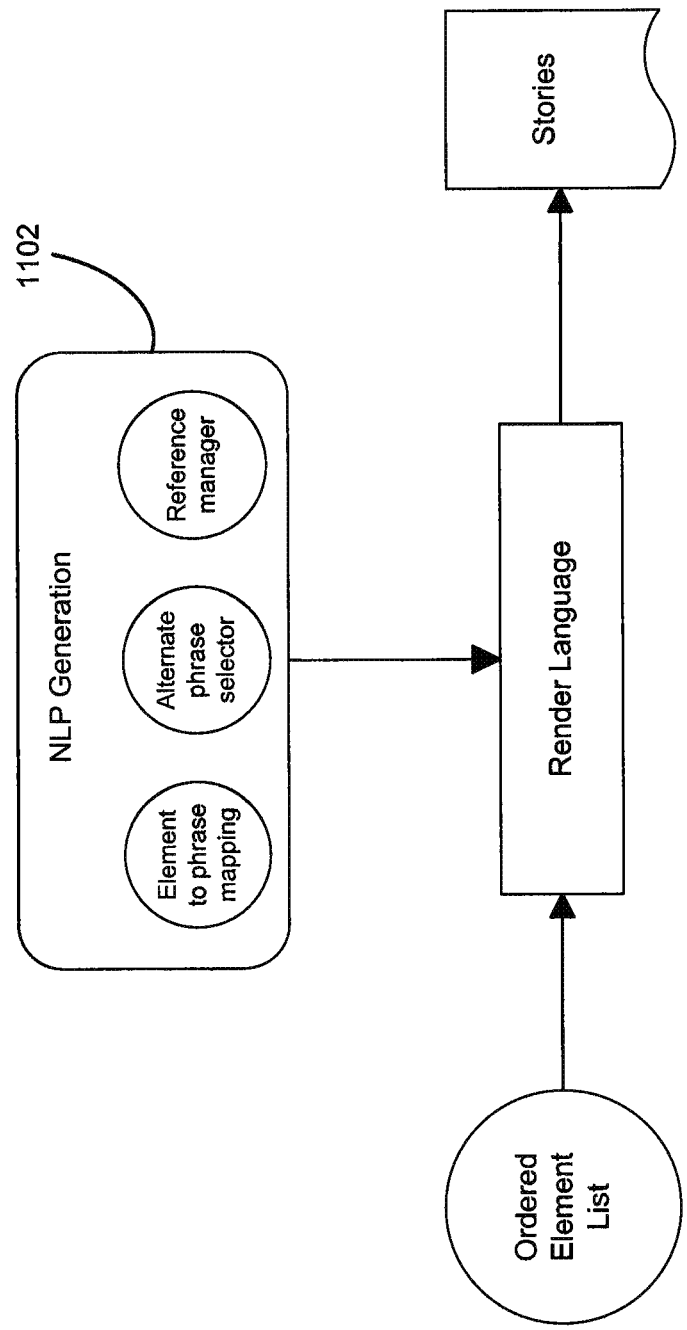
FIG. 11 illustrates an exemplary system which functions to render the narrative story in accordance with the process illustrated in FIG. 2.

Once all relevant angles, points, additional information elements, etc. have been identified, selected, assembled, and ordered, no further decision-making is required with respect to what to say, but only with respect to how to say it. To this end, the system utilizes one or more writers 1102 that function, as shown in FIG. 11, to receive XML, or other data representations of the story, e.g., each angle, point, and/or additional information item to be included in or with the story, to look up the appropriate data models, and to generate the final narrative story in natural language. This is done in a relatively standard way by traversing the representations recursively, and invoking phrasal generation routines associated with particular types of data (angles, points, etc.) in the representations. These routines output and assemble actual phrases or words of English or any other natural language to convey the meaning of the underlying representation. To provide variability to the narrative stories, the angles, points, and additional information items that are used to construct the narrative story can be described using different phrases or words. Narrative stories can also be rendered from different points of view by providing alternative phrasings for the relevant angles; for example, a "come from behind victory" for one team is a "heartbreaking last-minute defeat" for the opposing team.[5] Additionally, angles can be written in varying forms representative of their position within the narrative story, e.g., an angle can be written as story lead and as a lower paragraph one of which will be used according to the importance of the angle within the narrative story. The writer also functions to insert point references into the narrative story angles as appropriate and locate the additional information elements as required. As noted previously, the writer may also be used to provide the angles/narrative story in an appropriate language, at a given reading level, etc. Note additionally that the underlying representation could also be used to drive queries against a database of annotated video segments from the game, and thus used to assemble a "game highlights" video along with commentary. Alternatively, the representation could even be used to drive a graphical simulation, resulting in a "re-enactment" of the game by simulated characters.

[5] Point of view can also be taken into account by utilizing multiple related instances of the same underlying angle, each representing that angle from a different point of view.

While various concepts have been described in detail, it will be appreciated by those skilled in the art that various modifications and alternatives to those concepts could be developed in light of the overall teachings of the disclosure. For example, while the described system allows a story constructor to define the parameters that are to be used to customize a narrative story for a given audience, it will be appreciated that the focus of the narrative story can be automatically determined as a function of the derived features that result from the domain input event data. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed herein are meant to be illustrative only and not limiting as to the scope of the invention which is to be given the full breadth of the appended claims and any equivalents thereof

What is claimed is:

1. An apparatus for automatically generating a narrative about a structured data set, the narrative comprising natural language text arranged in a narrative format, the apparatus comprising:

a memory configured to store a plurality of data structures that represent different characterizations of data, wherein the data structures specify a plurality of applicability conditions for testing against data within or derived from the structured data set to support a determination as to whether any of the characterizations accurately characterize the structured data set; and a processor for cooperation with the memory, the processor configured to:

compute a plurality of derived features from the structured data set, wherein the structured data set comprises data that falls into a plurality of fields and/or categories and which relates to specific events, situations, entities, or aggregations thereof, and wherein the data of the structured data set includes numeric values;

retrieve a plurality of the applicability conditions from the memory;

test data against a plurality of the retrieved applicability conditions, wherein the tested data comprises at least one of (1) data within the structured data set and/or (2) data within the computed derived features;

in response to the tests, (1) determine that a plurality of the characterizations serve as candidate characterizations that accurately characterize the structured data set and (2) filter the candidate characterizations to select at least one of the candidate characterizations; and automatically render the natural language text for display based at least in part on (1) the selected at least one characterization and (2) at least one of (i) data within the structured data set and/or (ii) data within the computed derived features such that the rendered natural language text describes the structured data set in accordance with the selected at least one characterization.

2. The apparatus of claim 1 wherein the tested data comprises (1) data within the structured data set and (2) data within the computed derived features.

3. The apparatus of claim 2 wherein each of a plurality of the data structures is further associated with an importance value, and wherein the processor is further configured to filter the candidate characterizations based at least in part on the importance values associated with the data structures that represent the candidate characterizations.

4. The apparatus of claim 3 wherein the importance values comprise a plurality of fixed values.

5. The apparatus of claim 3 wherein the processor is further configured to compute a plurality of the importance values based on at least one of (1) data within the structured data set and/or (2) data within the computed derived features.

6. The apparatus of claim 1 wherein the data structures do not themselves comprise any specific text for the narrative.

7. The apparatus of claim 1 wherein the selected at least one characterization comprises a plurality of selected characterizations; and wherein the processor is further configured to automatically render the natural language text for display based at least in part on (1) the selected characterizations and (2) at least one of (i) data within the structured data set and/or (ii) data within the computed derived features such that the rendered natural language text describes the structured data set in accordance with the selected characterizations.

8. The apparatus of claim 7 wherein the processor is further configured to:
prioritize the selected characterizations; and
automatically render the natural language text for display such that the generated text describes the structured data set in accordance with the prioritization of the selected characterizations.

9. The apparatus of claim 8 wherein each of a plurality of the data structures is further associated with an importance value, and wherein the processor is further configured to prioritize the selected characterizations based at least in part on the importance values associated with the data structures that represent the selected characterizations.

10. The apparatus of claim 7 wherein the memory is further configured to store a plurality of phrasal generation routines, wherein each of a plurality of the data structures is associated with a phrasal generation routine from among the plurality of phrasal generation routines; and
wherein the processor is further configured to render the natural language text for display based on an invocation of the phrasal generation routine associated with the selected characterizations.

11. The apparatus of claim 10 wherein each of a plurality of the data structures comprises a plurality of points that support the characterization represented by that data structure; and
wherein the processor is further configured to (1) select and assemble a plurality of elements of the structured data set to create an element list data structure that connects the selected elements to the points of the selected characterizations and (2) render the natural language text for display based at least in part on an application of the selected elements from the element list data structure to the invoked phrasal generation routine to thereby output and assemble a plurality of phrases in a natural language that describe the structured data set based at least in part on the points that support the selected characterizations.

12. The apparatus of claim 11 wherein each of a plurality of the data structures is associated with an importance value; and
wherein the processor is further configured to (1) determine an order for an expression in the natural language text of the selected characterizations based at least in part on the importance values associated with the candidate data structures that represent the selected characterizations, (2) perform the element selection for each of the selected characterizations to generate a plurality of the element list data structures, (3) generate an angle list data structure that represents the ordered data structures, (4) assemble the elements of the element list data structures based at least in part on the angle list data structure to generate an ordered element list data structure, and (5) render the natural language text for display based at least in part on the ordered element list data structure and an application of the elements from the ordered element list data structure to the invoked phrasal generation routine to thereby output and assemble a plurality of phrases in a natural language that describe the structured data set based on the points that support the selected characterizations.

13. The apparatus of claim 12 wherein the processor is further configured to render the natural language text for display based at least in part on a recursive traversal of the ordered element list data structure and an application of the recursively traversed elements from the ordered element list data structure to the invoked phrasal generation routine to thereby output and assemble a plurality of phrases in a natural language that describe the structured data set based at least in part on the points that support the selected characterizations.

14. The apparatus of claim 12 wherein the processor is further configured to (1) filter the selected characterizations based at least in part on the importance values associated with the data structures that represent the selected characterizations to yield a set of filtered characterizations and (2) perform the order determination with respect to the filtered characterizations.

15. The apparatus of claim 1 wherein the structured data set comprises a plurality of data elements, and wherein the processor is further configured to (1) identify one or more of the data elements that are to be included within the narrative based at least in part on the selected at least one characterization and (2) automatically render the natural language text for display using the selected at least one characterization and the one or more identified data elements.

16. The apparatus of claim 1 wherein the processor comprises a plurality of processors.

17. A computer program product for automatically generating a narrative about a structured data set, the narrative comprising natural language text arranged in a narrative format, the computer program product comprising:
a plurality of computer executable instructions resident on a non-transitory computer-readable storage medium, the instructions, when executed by a computing device, configured to cause the computing device to:
access a plurality of data structures in a memory that represent different characterizations of data, wherein the data structures specify a plurality of applicability conditions for testing against data within or derived from the structured data set to support a determination as to whether any of the characterizations accurately characterize the structured data set;
compute a plurality of derived features from the structured data set, wherein the structured data set comprises data that falls into a plurality of fields and/or categories and which relates to specific events, situations, entities, or aggregations thereof, and wherein the data of the structured data set includes numeric values;
test data against a plurality of the applicability conditions for a plurality of the accessed data structures, wherein the tested data comprises at least one of (1) data within the structured data set and/or (2) data within the computed derived features;
in response to the tests, (1) determine that a plurality of the characterizations serve as candidate characterizations that accurately characterize the structured data set and (2) filter the candidate characterizations to select at least one of the candidate characterizations; and
automatically render the natural language text for display based at least in part on (1) the selected at least one characterization and (2) at least one of (i) data within the structured data set and/or (ii) data within the computed derived features such that the rendered natural language text describes the structured data set in accordance with the selected at least one characterization.

18. A method for automatically generating a narrative about a structured data set, the narrative comprising natural language text arranged in a narrative format, the method comprising:

a processor computing a plurality of derived features from the structured data set, wherein the structured data set comprises data that falls into a plurality of fields and/or categories and which relates to specific events, situations, entities, or aggregations thereof, and wherein the data of the structured data set includes numeric values;

a processor accessing a plurality of data structures in a memory that represent different characterizations of data, wherein the data structures specify a plurality of applicability conditions for testing against data within or derived from the structured data set to support a determination as to whether any of the characterizations accurately characterize the structured data set;

a processor testing data against a plurality of the applicability conditions for a plurality of the accessed data structures, wherein the tested data comprises at least one of (1) data within the structured data set and/or (2) data within the computed derived features;

in response to the testing, a processor, (1) determining that a plurality of the characterizations serve as candidate characterizations that accurately characterize the structured data set and (2) filtering the candidate characterizations to select at least one of the candidate characterizations; and a processor automatically rendering the natural language text for display based at least in part on (1) the selected at least one characterization and (2) at least one of (i) data within the structured data set and/or (ii) data within the computed derived features such that the rendered natural language text describes the structured data set in accordance with the selected at least one characterization.

19. The method of claim 18 wherein the tested data comprises (1) data within the structured data set and (2) data within the computed derived features.

20. The method of claim 19 wherein each of a plurality of the data structures is further associated with an importance value, and wherein the filtering step further comprises a processor filtering the candidate characterizations based at least in part on the importance values associated with the data structures that represent the candidate characterizations.

21. The method of claim 20 further comprising:

a processor computing a plurality of the importance values based on at least one of (1) data within the structured data set and/or (2) data within the computed derived features.

22. The method of claim 18 wherein the data structures do not themselves comprise any specific text for the narrative.

23. The method of claim 18 wherein the selected at least one characterization comprises a plurality of selected characterizations, and wherein the rendering step further comprises:

a processor automatically rendering the natural language text for display based at least in part on (1) the selected characterizations and (2) at least one of (i) data within the structured data set and/or (ii) data within the computed derived features such that the rendered natural language text describes the structured data set in accordance with the selected characterizations.

24. The method of claim 18 wherein the same processor performs the computing, accessing, testing, determining, filtering, and automatically rendering steps.

25. The method of claim 18 wherein multiple processors perform the computing, accessing, testing, determining, filtering, and automatically rendering steps in a distributed environment.

* * * * *